US012767104B2

(12) United States Patent
Jiang et al.

(10) Patent No.: US 12,767,104 B2
(45) Date of Patent: Oct. 20, 2026

(54) ASSISTED PEDAL DRIVE

(71) Applicant: VOLVO TRUCK CORPORATION, Gothenburg (SE)

(72) Inventors: Bincheng Jiang, Gothenburg (SE); Mattias Andreasson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 73 days.

(21) Appl. No.: 18/678,859

(22) Filed: May 30, 2024

(65) Prior Publication Data

US 2024/0400017 A1 Dec. 5, 2024

(30) Foreign Application Priority Data

Jun. 2, 2023 (EP) .................................... 23177009

(51) Int. Cl.

*B60T 8/58* (2006.01)
*B60Q 9/00* (2006.01)
*B60T 8/171* (2006.01)
*B60T 8/172* (2006.01)
*F02D 41/02* (2006.01)

(52) U.S. Cl.

CPC .................. *B60T 8/58* (2013.01); *B60Q 9/00* (2013.01); *B60T 8/171* (2013.01); *B60T 8/172* (2013.01); *F02D 41/021* (2013.01); *B60T 2210/20* (2013.01); *B60T 2210/32* (2013.01); *B60T 2250/04* (2013.01); *F02D 2200/101* (2013.01); *F02D 2200/702* (2013.01)

(58) Field of Classification Search

CPC ........... B60W 30/18; B60W 30/18181; B60W 30/18127; B60W 50/16; B60W 50/0097; B60W 10/04; B60W 2552/15; B60W 2552/25; B60W 2540/10; B60W 2555/60; B60W 2710/0666; B60W 2710/083

See application file for complete search history.

(56) References Cited

U.S. PATENT DOCUMENTS

| | | | |
|---|---|---|---|
| 8,849,539 | B2 | 9/2014 | Johansson et al. |
| 9,248,836 | B2 | 2/2016 | Johansson et al. |
| 10,197,156 | B2 | 2/2019 | Sujan et al. |

(Continued)

FOREIGN PATENT DOCUMENTS

| | | | |
|---|---|---|---|
| DE | 102014009856 | A1 | 1/2016 |
| GB | 2571325 | A | 8/2019 |
| WO | 2013136744 | A1 | 9/2013 |

OTHER PUBLICATIONS

Translation WO 2013/136744 (Year: 2013).*

(Continued)

*Primary Examiner* — Huan Le

(74) *Attorney, Agent, or Firm* — Jeffri A. Kaminski; Venable LLP

(57) ABSTRACT

A computer system comprising processing circuitry is described. The processing circuitry is configured to obtain topography data of a current road segment and an upcoming road segment and to determine a topography change between the current road segment and the upcoming road segment. The processing circuitry is further configured to determine a maximum propulsion torque based on the topography change and to limit a torque indicatable by an operator-controlled input of a vehicle based on the maximum propulsion torque.

17 Claims, 6 Drawing Sheets

(56) References Cited

U.S. PATENT DOCUMENTS

| | | | | |
|---|---|---|---|---|
| 2007/0265759 | A1 | 11/2007 | Salinas et al. | |
| 2011/0106388 | A1* | 5/2011 | Boeckenhoff | B60W 10/06 701/70 |

OTHER PUBLICATIONS

Extended European Search Report in corresponding European Application No. 23177009.0 dated Nov. 23, 2023 (8 pages).

Scania Marketing News, No. 13011/2; "Scania Opticruise with performance modes"; dated Apr. 16, 2013; 10 pages; <https://www.scribd.com/document/492046025/13011-2-PerformanceModes>.

* cited by examiner

ASSISTED PEDAL DRIVE

TECHNICAL FIELD

The disclosure relates generally to propulsion control of vehicles. In particular aspects, the disclosure relates to assisted pedal drive. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

One-pedal drive, also known as regenerative braking or one-pedal regen, is a concept commonly used in electric vehicles (EVs), but may also be used in vehicles having combustion engines. One-pedal drive allows a driver or operator of a vehicle to control both acceleration and deceleration using a single pedal. Instead of using separate pedals for the accelerator (gas pedal) and brake, the driver can control both functions with the same pedal, usually referred to as the "accelerator pedal" or "drive pedal."

Eco-driving, also known as green driving or fuel-efficient driving, is a concept that promotes driving techniques and habits aimed at minimizing fuel consumption and reducing the environmental impact of vehicles. The primary objective of eco-driving is to achieve optimal energy efficiency and reduce greenhouse gas emissions while maintaining safe and comfortable driving conditions. The importance of eco-driving is ever-increasing and it is common for e.g. logistic companies to educate their drivers in eco-driving.

Education and training of drivers is efficient in spreading the concept of eco-driving, but investing time on training the drivers and perhaps also increasing downtime for vehicles used during training, is costly for companies.

SUMMARY

It is in view of the above considerations and others that the various embodiments of this disclosure have been made. The present disclosure therefor recognizes the fact that there is a need for alternatives to (e.g. improvement of) the existing art described above. It is an object of some embodiments to solve, mitigate, alleviate, reduce or eliminate at least some of the above or other disadvantages.

According to a first aspect of the disclosure, a computer system comprising processing circuitry is presented. The processing circuitry is configured to obtain topography data of a current road segment and an upcoming road segment. The processing circuitry is further configured to determine a topography change between the current road segment and the upcoming road segment, and to determine a maximum propulsion torque based on the topography change. The processing circuitry is further configured to limit, at the current road segment, a torque indicatable by an operator-controlled input of a vehicle based on the maximum propulsion torque. The first aspect of the disclosure may seek to educate an operator of the vehicle in propelling the vehicle in an eco-friendly manner. A technical benefit may include assisting an operator in propelling the vehicle in a more eco-friendly manner and further to educate the driver on how to propel the vehicle in an eco-friendly manner.

Optionally in some examples, including in at least one preferred example, the processing circuitry is further configured to, responsive to the topography change indicating an uphill change in topography, increase the maximum propulsion torque. A technical effect may include assisting the operator in preventing the vehicle from having to accelerate during the uphill segment, thereby allowing more energy efficient propulsion of the vehicle.

Optionally in some examples, including in at least one preferred example, the processing circuitry is further configured to, responsive to the topography change indicating a downhill change in topography, decrease the maximum propulsion torque. A technical effect may include allowing the operator to benefit from the downhill slope when accelerating and reduces a risk that the vehicle will have to be braked during the downhill slope, thereby allowing more energy efficient propulsion of the vehicle.

Optionally in some examples, including in at least one preferred example, the processing circuitry is further configured to determine a maximum retardation torque based on the topography change and limit, at the current road segment, the torque indicatable by the operator-controlled pedal of the vehicle based on the maximum retardation torque. A technical effect of controlling the retardation torque indicatable by operator controlled may include further increasing the degrees of freedom in assisting the operator in propelling the vehicle in a more eco-friendly manner and further to educate the driver on how to propel the vehicle in an eco-friendly manner.

Optionally in some examples, including in at least one preferred example, the processing circuitry is further configured to, responsive to the topography change indicating an uphill change in topography, decrease the maximum retardation torque. This is beneficial as it assists the operator of the vehicle in preventing having to accelerate during the uphill segment, thereby allowing more energy efficient propulsion of the vehicle.

Optionally in some examples, including in at least one preferred example, the processing circuitry is further configured to, responsive to the topography change indicating a downhill change in topography, increase the maximum retardation torque. A technical effect may include allowing the operator to benefit from the downhill slope when accelerating and reduces a risk that the vehicle will have to be braked during the downhill slope, thereby allowing more energy efficient propulsion of the vehicle.

Optionally in some examples, including in at least one preferred example, the processing circuitry is further configured to obtain a current speed of the vehicle and a speed limit of the current road segment; and determine the maximum propulsion torque based on a difference between the current speed of the vehicle and the speed limit of the current road segment. This is beneficial as it decreases a risk that the operator will e.g. accelerate the vehicle too much if there is a small difference between the current speed of the vehicle and the speed limit of the current road segment.

Optionally in some examples, including in at least one preferred example, the operator-controlled input is a pedal of the vehicle, preferably an accelerator of the vehicle. This is beneficial as a pedal is the common operator-controlled input utilized with one-pedal drive.

Optionally in some examples, including in at least one preferred example, the processing circuitry is further configured to limit the torque indicatable by the operator-controlled input by controlling a haptic feedback of the operator-controlled input. A technical effect may include providing tangible feedback to the operator further assisting the operator in propelling the vehicle in a more eco-friendly manner and further educates the driver on how to propel the vehicle in an eco-friendly manner.

Optionally in some examples, including in at least one preferred example, the processing circuitry is further configured to, responsive to the topography change indicating an uphill change in topography, increase the maximum propulsion torque; responsive to the topography change indicating a downhill change in topography, decrease the maximum propulsion torque; determine a maximum retardation torque based on the topography change; limit, at the current road segment, the torque indicatable by the operator-controlled pedal of the vehicle based on the maximum retardation torque; responsive to the topography change indicating an uphill change in topography, decrease the maximum retardation torque; responsive to the topography change indicating a downhill change in topography, increase the maximum retardation torque; obtain a current speed of the vehicle and a speed limit of the current road segment; determine the maximum propulsion torque based on a difference between the current speed of the vehicle and the speed limit of the current road segment; and limit, at the current road segment, the torque indicatable by the operator-controlled input by controlling a haptic feedback of the operator-controlled input; wherein the operator-controlled input is a pedal of the vehicle, preferably an accelerator of the vehicle.

According to a second aspect of the disclosure, a vehicle comprising the computer system of the first aspect is presented.

Optionally in some examples, including in at least one preferred example, the vehicle is a heavy-duty vehicle.

According to a third aspect of the disclosure, a computer implemented method is presented. The method comprises obtaining, by a processing circuitry of a computer system, topography data of a current road segment and an upcoming road segment and determining, by the processing circuitry of the computer system, a topography change between the current road segment and the upcoming road segment. The method further comprises determining, by the processing circuitry of the computer system, a maximum propulsion torque based on the topography change; and limiting, at the current road segment, by the processing circuitry of the computer system, a torque indicatable by an operator-controlled input of a vehicle based on the maximum propulsion torque. The third aspect of the disclosure may seek to educate an operator of the vehicle in propelling the vehicle in an eco-friendly manner. A technical benefit may include assisting an operator in propelling the vehicle in a more eco-friendly manner and further to educate the driver on how to propel the vehicle in an eco-friendly manner.

Optionally in some examples, including in at least one preferred example, computer implemented method further comprises, responsive to the topography change indicating an uphill change in topography, increasing, by the processing circuitry of the computer system, the maximum propulsion torque. This is beneficial as it assists the operator in preventing the vehicle from having to accelerate during the uphill segment, thereby allowing more energy efficient propulsion of the vehicle.

Optionally in some examples, including in at least one preferred example, the computer implemented method further comprises, responsive to the topography change indicating a downhill change in topography, decreasing, by the processing circuitry of the computer system, the maximum propulsion torque. This is beneficial as it allows the operator to benefit from the downhill slope when accelerating and reduces a risk that the vehicle will have to be braked during the downhill slope, thereby allowing more energy efficient propulsion of the vehicle.

Optionally in some examples, including in at least one preferred example, the computer implemented method further comprises determining, by the processing circuitry of the computer system, a maximum retardation torque based on the topography change; and limiting, at the current road segment, by the processing circuitry of the computer system, the torque indicatable by the operator-controlled input of the vehicle based on the maximum retardation torque. Controlling the retardation torque indicatable by operator controlled input is beneficial as it further increases the degrees of freedom in assisting the operator in propelling the vehicle in a more eco-friendly manner and further educates the driver on how to propel the vehicle in an eco-friendly manner.

Optionally in some examples, including in at least one preferred example, the computer implemented method further comprises, responsive to the topography change indicating an uphill change in topography, decreasing, by the processing circuitry of the computer system, the maximum retardation torque. This is beneficial as it assists the operator of the vehicle in preventing having to accelerate during the uphill segment, thereby allowing more energy efficient propulsion of the vehicle.

Optionally in some examples, including in at least one preferred example, the computer implemented method further comprises, responsive to the topography change indicating a downhill change in topography, increasing, by the processing circuitry of the computer system, the maximum retardation torque. This is beneficial as it allows the operator to benefit from the downhill slope when accelerating and reduces a risk that the vehicle will have to be braked during the downhill slope, thereby allowing more energy efficient propulsion of the vehicle.

According to a third aspect of the disclosure, a computer program product is presented. The computer program product comprises instructions for performing, when executed by the processing circuitry, the method of the second aspect.

According to a third aspect of the disclosure, a non-transitory computer-readable storage medium is presented. The non-transitory computer-readable storage comprises instructions, which when executed by the processing circuitry, cause the processing circuitry to perform the method of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1A:
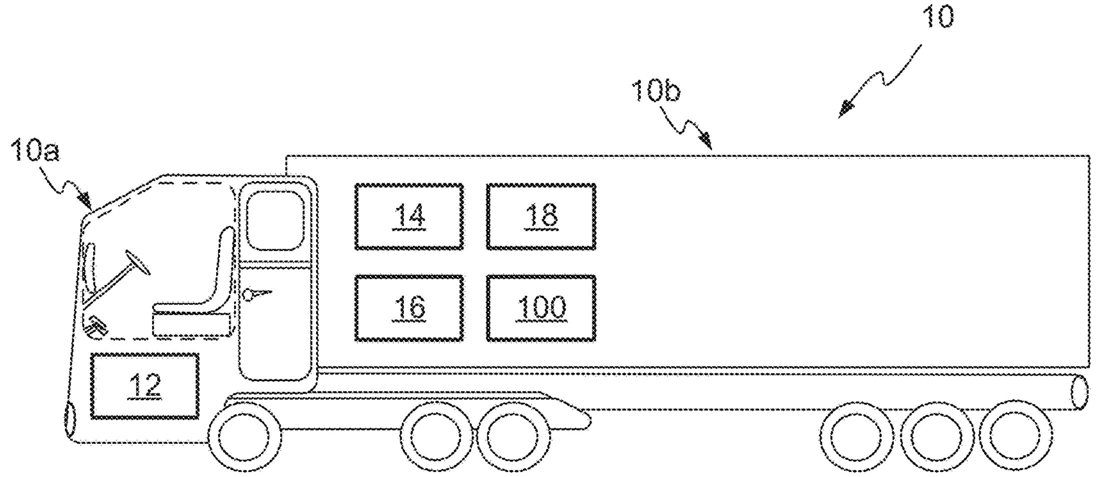
FIG. 1A is an exemplary side view of a vehicle according to an example.

The detailed description set forth below provides information and examples of the disclosed technology with sufficient detail to enable those skilled in the art to practice the disclosure.

Hereinafter, certain embodiments will be described more fully with reference to the accompanying drawings. The invention described throughout this disclosure may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

The term “coupled” is defined as connected, although not necessarily directly, and not necessarily mechanically. Two or more items that are “coupled” may be integral with each other. The terms “a” and “an” are defined as one or more unless this disclosure explicitly requires otherwise. The terms “substantially”, “approximately”, and “about” are defined as largely, but not necessarily wholly what is specified, as understood by a person of ordinary skill in the art. The terms “comprise” (and any form thereof, such as “comprises” and “comprising”), “have” (and any form thereof, such as “has” and “having”, “include” (and any form thereof, such as “includes” and “including”) and “contain” (and any form thereof, such as “contains” and “containing”) are open-ended linking verbs. As a result, a method that “comprises”, “has”, “includes” or “contains” one or more steps possesses those one or more steps, but is not limited to possessing only those one or more steps.

As mentioned above, the primary objective of eco-driving is to achieve optimal energy efficiency and reduce greenhouse gas emissions while maintaining safe and comfortable driving conditions. To this end, eco-driving generally comprises smooth acceleration and braking since rapid acceleration and harsh braking generally lead to increased fuel consumption. Eco-driving encourages gradual acceleration and deceleration (retardation), allowing the vehicle to reach a steady speed more efficiently. Eco-driving generally promotes maintaining a consistent speed in order to avoid unnecessary speed fluctuations. Consistent speeds contribute to better fuel efficiency by reducing energy waste caused by constant acceleration and deceleration. Further, anticipation of a traffic flow may increase fuel efficiency. By observing the road ahead of the vehicle and anticipating traffic conditions, eco-drivers may adjust their driving style accordingly. This avoids sudden stops and enables the utilization of momentum from downhill slopes while minimizing idle time. Eco-driving may also relate to optimal gear shifting. Shifting to higher gears at appropriate times and maintaining engine revolutions per minute (RPM) within a recommended range may improve fuel efficiency. This generally involves an understanding of the vehicle’s gear ratios and engine performance.

In order to comfortably operate a vehicle, in particular a heavy-duty vehicle, it is common to have the vehicle provided with a one-pedal drive functionality. One-pedal drive generally works during acceleration, e.g. when the driver depresses the accelerator pedal, for allowing a propulsion source of the vehicle (electric motor, combustion engine, kinetic energy recovery system (KERS), etc.) to deliver power to the wheels, thereby propelling the vehicle forward. This is similar to the traditional gas pedal function. When the driver releases pressure on the accelerator pedal or the drivers’ foot is entirely released, a propulsion source may operate in a generator mode, or a retarder may be engaged on a propulsion or drive shaft of the vehicle. In this mode, the vehicle’s momentum is harvested to generate electricity and recharge a battery of the vehicle, accelerate a KERS etc., while simultaneously providing a retarding force that reduces a speed of the vehicle. As the driver further reduces pressure on the accelerator pedal, the (regenerative) braking effect becomes more pronounced, resulting in greater deceleration. In some vehicles, this may be adjusted to provide different levels of regenerative braking, allowing drivers to customize their driving experience.

FIG. 1A is an exemplary schematic illustration of a heavy-duty vehicle 10 (hereinafter referred to vehicle 10 for reasons of brevity). This particular vehicle 10 comprises a tractor unit 10*a* which is arranged to tow a trailer unit 10*b*. In other examples, other heavy-duty vehicles may be employed, e.g., trucks, buses, and construction equipment. The vehicle 10 comprises at least one propulsion source 12 configured to propel the vehicle 10. The propulsion source 12 may be any suitable propulsion source 12 selected depending on e.g. specific application, energy requirements, environmental considerations etc. The propulsion source 12 may be e.g. a diesel engine, a gas engine, an electrical motor, a hydrogen fuel cell or combinations thereof. Although not explicitly visualized in FIG. 1A, the skilled person will appreciate that the vehicle 10 comprises all necessary vehicle units and associated functionality such that it may operate as the skilled person would expect of a vehicle 10. Emphasis in the present disclosure is rather directed at energy efficient operation of the vehicle 10, and in particular energy efficient one-input operation of the vehicle 10.

The vehicle 10 in FIG. 1A comprises at least one operator-controlled input 14. The operator-controlled input 14 may be any suitable input device, means, or interface exemplified by, but not limited to, a pedal, a lever, a joystick, a touch display, a motion sensor etc. Advantageously, the operator-controlled input 14 is a pedal and more advantageously an accelerator. The operator-controlled input 14 may be a driven operator-controlled input 14 such that a haptic feedback of the operator-controlled input 14 may be controlled.

The vehicle 10 in FIG. 1A further comprises one or more sensors 16. The sensors 16 may be any suitable sensors configured to measure, sense or otherwise obtain data relevant for e.g. operation of the vehicle 10. The sensors 16 may be one or more of, but are not limited to, a speedometer configured to obtain a current speed of the vehicle 10, a fuel gauge configured to obtain a current amount fuel available at the vehicle 10, a power meter configured to obtain a current amount of power consumed by the propulsion source 12 of the vehicle 10, an accelerometer and/or a gyro configured to obtain a current inclination of the vehicle 10, etc.

The vehicle 10 in FIG. 1A further comprises a computer system 100. The computer system 100 is advantageously operatively connected to all suitable devices, systems and features of the vehicle 10. The computer system 100 is configured to control the maximum and/or minimum propulsion requested by the operator-controlled input 14. This will be further detailed in the later sections of the present disclosure.

Figure 1B:
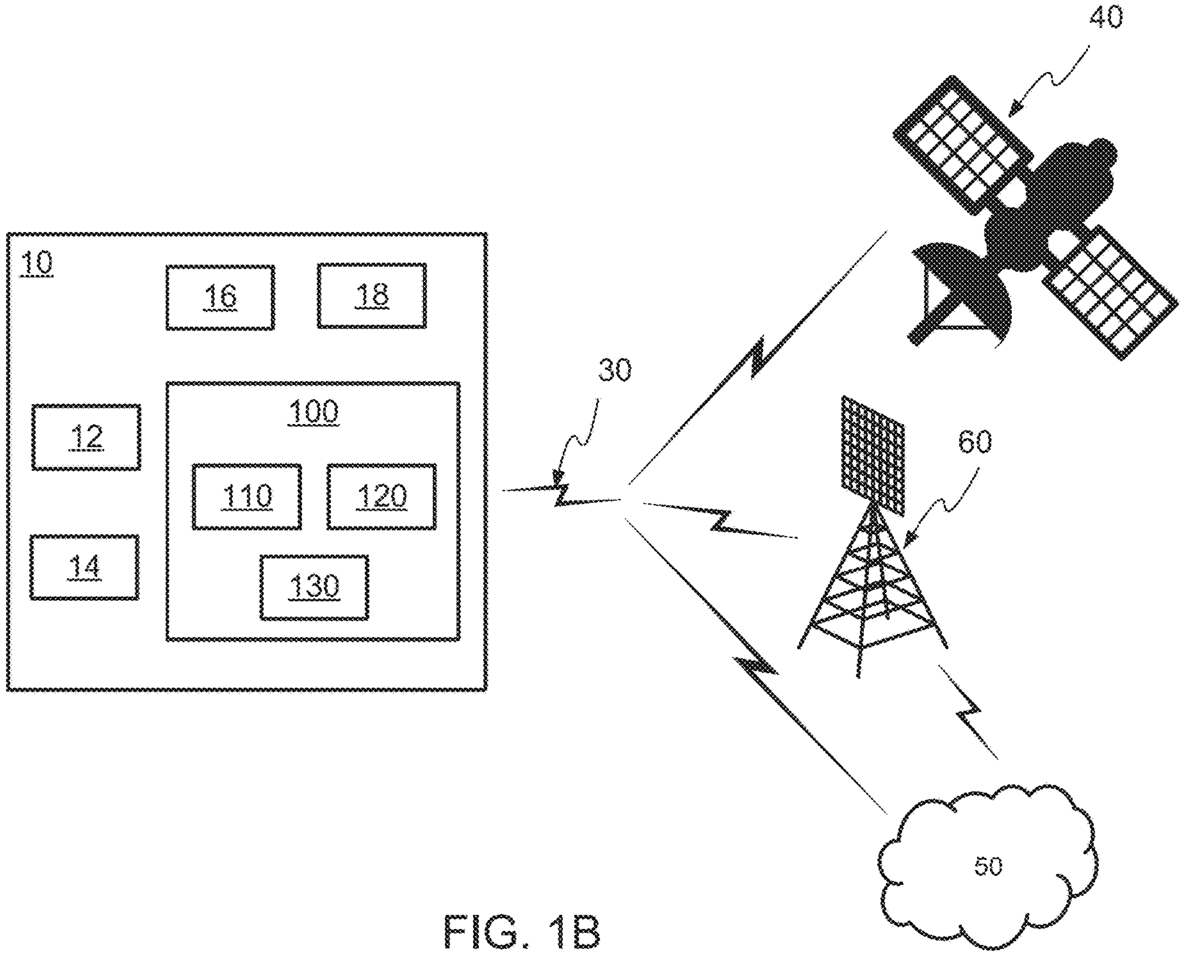
FIG. 1B is an exemplary block diagram of a vehicle according to an example.

The vehicle 10 in FIG. 1A may further comprises at least one communications device 18. As is best seen in FIG. 1B, the communications device 18 is advantageously configured for communication with any suitable external device, system or feature via an external communications interface 30. In FIG. 1B, the external devices are exemplified by a GPS satellite 40 which implies that the communications device 18 comprises a GPS receiver and the communications interface 30 is/comprises a GPS interface. The external devices are further exemplified by a cloud service 50 which implies that the communications interface 30 is/comprises a suitable internet interface. The cloud service 50 may be connected directly to the communications interface 30 or via the cellular base station 60. The external devices are further exemplified by a cellular base station 60 which implies that the communications device 18 comprises a cellular modem and the communications interface 30 is/comprises a cellular network. Specific examples of the communications interface 30 comprise, but are not limited to HTTP(S), TCP/IP, UDP, FTP, SMTP, DNS, DHCP, SSH, POP3, SCP, NFS, SFTP, ICMP, ARP, RTP, RTCP IEEE 802.11, IEEE 802.15, ZigBee, WirelessHART, WiFi, Bluetooth®, BLE, RFID, WLAN, MQTT IT, COAP, DDS, NFC, AMQP, LoRaWAN, Z-Wave, Sigfox, Thread, EnOcean, mesh communication, any form of proximity-based device-to-device radio communication, LTE Direct, W-CDMA/HSPA, GSM, UTRAN, LTE, IPv4, IPV6, 6LoWPAN, IrDA, or 5G NR. The skilled person will know how to select and configure suitable communications devices 18 based on the communications interface 30.

The block diagram of the vehicle 10 shown in FIG. 1B further details the computer system 100. The computer system 100 comprises a processing circuitry 110, and advantageously a storage device 120 and an interface 130. The storage device 120 may be any suitable volatile or non-volatile storage device configured to store data and/or program instructions accessible by the processing circuitry 110. The storage device 120 and the processing circuitry 110 may form one integrated circuit (IC). The interface 130 may be configured to provide operative connection to other device, functions or systems of the vehicle 10 and/or to the communications interface 30. In some examples, the interface 130 is, or forms a part of, the communications device 18 of the vehicle 10.

The inventors behind the present disclosure have realized that, in order to assist an operator of a vehicle 10 to propel the vehicle 10 in an eco-friendly way, the propulsion requested (indicated) by the user controlled input 14 may be controlled. To exemplify, assume that the user controlled input 14 is an accelerator configured to control the propulsion of the propulsion source 12 of the vehicle 10. It is common knowledge that a fully depressed pedal will provide maximum propulsion torque, or propulsion for short, of the vehicle 10. Conversely, a fully released pedal will provide the minimum propulsion of the vehicle 10. Generally, the maximum propulsion and the minimum propulsion are determined by the propulsion source 12, such as a drive train, etc. and the operator will have to actively adapt the depression of the pedal in order to ensure an eco-friendly behavior. However, by controlling the propulsion provided by the pedal based on eco-driving data 31 (see FIG. 2), the operator may be assisted in operating the vehicle 10 in an eco-friendly manner and may be taught of how to operate the vehicle 10 in an eco-friendly manner. To exemplify, upon closing in on a stop sign, or any other road situation where it is likely that the vehicle 10 will have to stop, it would be wasted energy if the operator was to accelerate significantly as the vehicle 10 is to be stopped (braked, deaccelerated) shortly thereafter. To this end, the maximum propulsion provided by the pedal may be limited such that even upon maximally depressing (i.e. flooring) the pedal, the vehicle 10 would only accelerate a fraction of what it would have been capable of without the limitation to the propulsion provided by the pedal.

Further to this, when operating the vehicle 10 in the previously described one-pedal drive mode, a retardation torque, or retardation for short, advantageously applies regenerative retardation when the pedal is released. In continuation of the example above, upon full release of the pedal, a maximum retardation is applied. Also the retardation may be controlled such that, upon closing in on the stop sign, the maximum retardation torque may be increased allowing the vehicle 10 to smoothly come to a stop with maximum regenerative braking. Further, upon closing in on an uphill segment of a road, the maximum retardation may be decreased to reduce a need to accelerate the vehicle 10 during the uphill segment.

In the following, torque, propulsion and/or retardation, will be used as a common indicator for control of propulsion of the vehicle 10. The methods, examples and features of the present disclosure are applicable with other indicators, labels or measures of propulsion control, such as, but not limited to power, acceleration, current to an electrical propulsion source etc.

Figure 2:
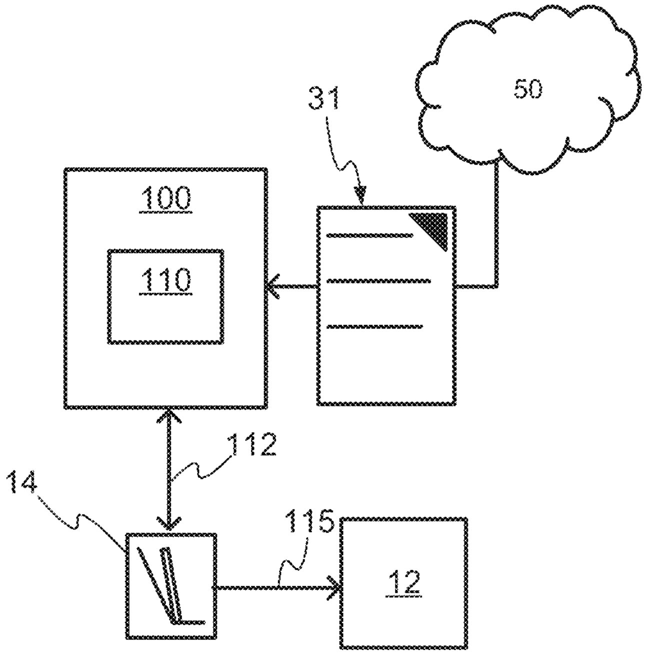
FIG. 2 is an exemplary block diagram of a computer system according to an example.

With reference to FIG. 2, an exemplary functionality of the present disclosure will be presented. The user controlled input 14 is configured to indicate a torque 115 provided to control propulsion (or retardation) of the propulsion source 12 of the vehicle 10. In FIG. 2, the user controlled input 14 is shown connected to the propulsion source 12, this is mainly for illustrative purposes and in some examples, further control circuitry, processing or devices may be provided between the user controlled input 14 and the propulsion source 12. The processing circuitry 110 of the computer system 100 is configured to control the torque 115 indicatable by the user controlled input 14. In an advantageous example, the processing circuitry 110 is configured to determine a maximum propulsion torque 112 and to limit the torque indicatable by the user controlled input 14 based on the maximum propulsion torque 112. For the present disclosure, a propulsion torque is defined as a positive torque for propelling the vehicle 10. The maximum propulsion torque 112 may be determined as any suitable value from zero to whatever physical maximum torque limit the propulsion source 12 may provide. The term indicatable, and specifically the torque indicatable by the user controlled input 14, is to mean a range of torque values that the user controlled input 14 is permitted to provide. That is to indicatable by may be interpreted as demonstrable by.

In order to determine the maximum propulsion torque 112, the processing circuitry 110 is advantageously configured to obtain eco-driving data 31. The eco-driving data 31 may be obtained from any suitable data storage, data provisioning service or device via any suitable interface. In FIG. 2, the eco-driving data 31 is obtained from the cloud service 50. The maximum propulsion torque 112 is determined based on the eco-driving data 31.

Advantageously, the maximum propulsion torque 112 is determined to be sufficiently high to maintain a current speed s of the vehicle 10. This may be provided by detecting if the user controlled input 14 is at its maximum position, i.e. arranged to indicate the maximum propulsion toque 112, and responsive to the current speed s of the vehicle 10 being reduced (i.e. the vehicle 10 is slowing down), the maximum propulsion torque 112 indicatable by the user controlled input 14 may be increased. Alternatively, or additionally, a lower limit for the maximum propulsion torque 112 indicatable by the user controlled input 14 may be configured, preventing the maximum propulsion torque 112 indicatable by the user controlled input 14 dropping below the lower limit. The lower limit may be a configurable lower limit configured based on e.g. a load of the vehicle 10 etc.

Figure 3:
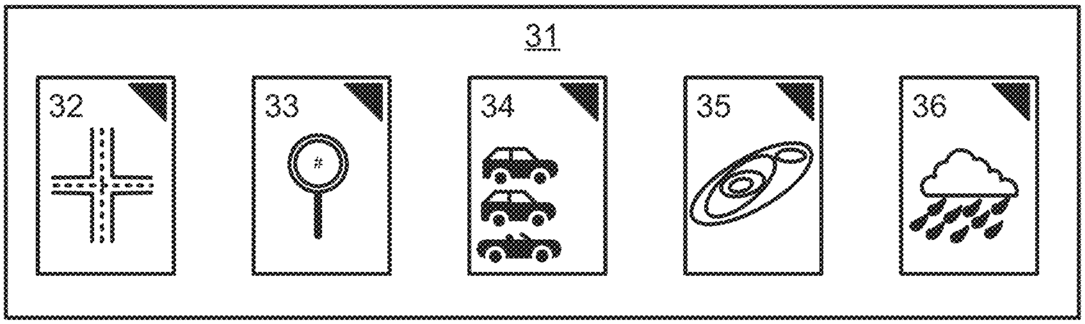
FIG. 3 is an exemplary block diagram of eco-driving data according to an example.

In FIG. 3, an exemplary block diagram of eco-driving data 31 is shown. The eco-driving data 31 comprises one or more of road layout data 32, speed limit data 33, traffic data 34, topography data 35 and/or weather data 36. The road layout data 32 may comprise data indicating intersections, stop signs, hard turns, etc. The speed limit data 33 may comprise speed limits of road segments. The traffic data 34 may comprise data indicating a current traffic situation, congestions, locations prone to congestions etc. The topography data 35 may comprise data indicating a topography of road segments, i.e. uphill, flat, downhill and/or altitude data etc. The weather data 36 may comprise data indicating current weather conditions, future weather conditions (weather forecast) etc. It should be mentioned that the eco-driving data 31 presented in FIG. 3 are examples of eco-driving data 31 and the eco-driving data 31 should not be considered limited to these examples.

The processing circuitry 110 may be configured to use any or all of the eco-driving data 31 presented in FIG. 3 when determining the maximum propulsion torque 112. Advantageously, the processing circuitry 110 is configured to determine the maximum propulsion torque 112 based on at least the topography data 35. The obtained topography data 35 is advantageously associated with a current, and/or an upcoming road segment to facilitate control of the torque 115 indicatable by the operator-controlled input 14 in an eco-driving manner.

Figure 4:
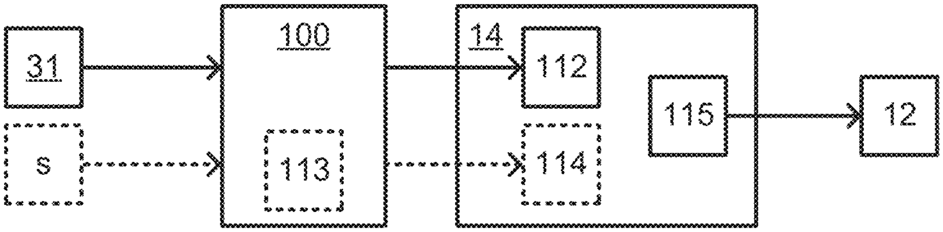
FIG. 4 is an exemplary block diagram of a computer system according to an example.

In FIG. 4, a further example of the present disclosure is shown. If FIG. 4, the computer system 100 obtains eco-driving data 31 comprising at least topography data 35 of a current road segment and an upcoming road segment. The current road segment is a segment of a road on (or at if it travels on the shoulder) which the vehicle 10 is currently travelling, and the upcoming road segment is a segment of a road on (or at if it travels on the shoulder) which the vehicle 10 is about to travel. The current road segment may be any suitable length from e.g. a length of the vehicle 10 to hundreds of meters. The upcoming road segment may comprise a series of road segment or be one single road segment. The upcoming road segment may be any suitable length or comprise a series of road segments each having the same length or different lengths. The upcoming road segment may, in some examples, be determined based on route planning data. In some examples, the upcoming road segment may be determined based on the current road segment, wherein the upcoming road segment may be determined to be a, in a direction of travel, next road segment along a currently travelled road. The computer system 100, or rather the processing circuitry 110 (not shown in FIG. 4), is advantageously configured to determine a topography change 113 between the current road segment and the upcoming road segment.

The topography change 113 may be determined in any suitable way such as by calculating a difference in altitude between the current road segment and the upcoming road segment. A negative topography change 113 may indicate that the upcoming road segment has a more downhill (or less uphill) inclination than the current road segment. A positive topography change 113 may indicate that the upcoming road segment has a more uphill (or less downhill) inclination than the current road segment. A zero (unity) topography change 113 may indicate that the upcoming road segment has a substantially equal inclination as the current road segment. A substantially equal inclination may be interpreted as a substantially flat or substantially level inclination. The topography change 113 may be determined as a difference between an average altitude of the current road segment and an average altitude of the upcoming road segment. The topography change 113 may be determined as a difference between an maximum altitude of the current road segment and a maximum altitude of the upcoming road segment. The topography change 113 may be determined as a difference between a topography at an end of the current road segment and an altitude at an end of the upcoming road segment.

The computer system 100 is advantageously configured to determine a maximum propulsion torque 112 based on the topography change 113. The determined maximum propulsion torque 112 may be utilized to limit the torque 115 indicatable by the operator-controlled input 14 of a vehicle 10. In some examples, the torque 115 indicatable by the operator-controlled input 14 is limited to the determined maximum propulsion torque 112.

As indicated in FIG. 4, the computer system 100 may optionally be configured to determine a maximum retardation torque 114 indictable by the operator-controlled input 14 based on the topography change 113. The determined maximum retardation torque 114 may be utilized to limit the torque 115 indicatable by the operator-controlled input 14 of the vehicle 10. In some examples, the torque 115 indicatable by the operator-controlled input 14 is limited to the determined maximum retardation torque 114. As the skilled person will appreciate, assuming a propulsion torque as a positive torque, the torque 115 indicatable by the operator-controlled input 14 is limited by a lower limit based on (or set to) the maximum retardation torque 114 and an upper limit based on (or set to) the maximum propulsion torque 112. The torque 115 indicatable by the operator-controlled input 14 may be described as being between the maximum retardation torque 114 and the maximum propulsion torque 112.

In a non-limiting explanatory example, the operator-controlled input 14 is a joystick providing an 8 bit digital value indicating a torque 115. The 8 bits provided by the joystick may represent up to 256 values ranging from 0 to 255 and it is assumed that 255 indicates the highest torque. Based on the topography data 35, e.g. an upcoming uphill segment, the maximum propulsion torque 112 may be determined to be 230 and the torque 115 indicatable by the joystick is limited to 230. This means the joystick in this case represents only 231 values ranging from 0 to 230.

In another non-limiting explanatory example, the operator-controlled input 14 is a joystick providing an 8 bit two's complement digital value indicating a torque 115. The 8 bits provided by the joystick may represent up to 256 values ranging from −127 to 128 and it is assumed that 128 indicates the highest torque and −127 the highest retardation. Based on the topography data 35, e.g. an upcoming uphill segment, the maximum propulsion torque 112 may be determined to be 117, the maximum retardation torque 114 determined to be −112 and the torque 115 indicatable by the joystick is limited to −112 and 117. This means the joystick in this case represent only values ranging from −112 to 117.

Figure 5:
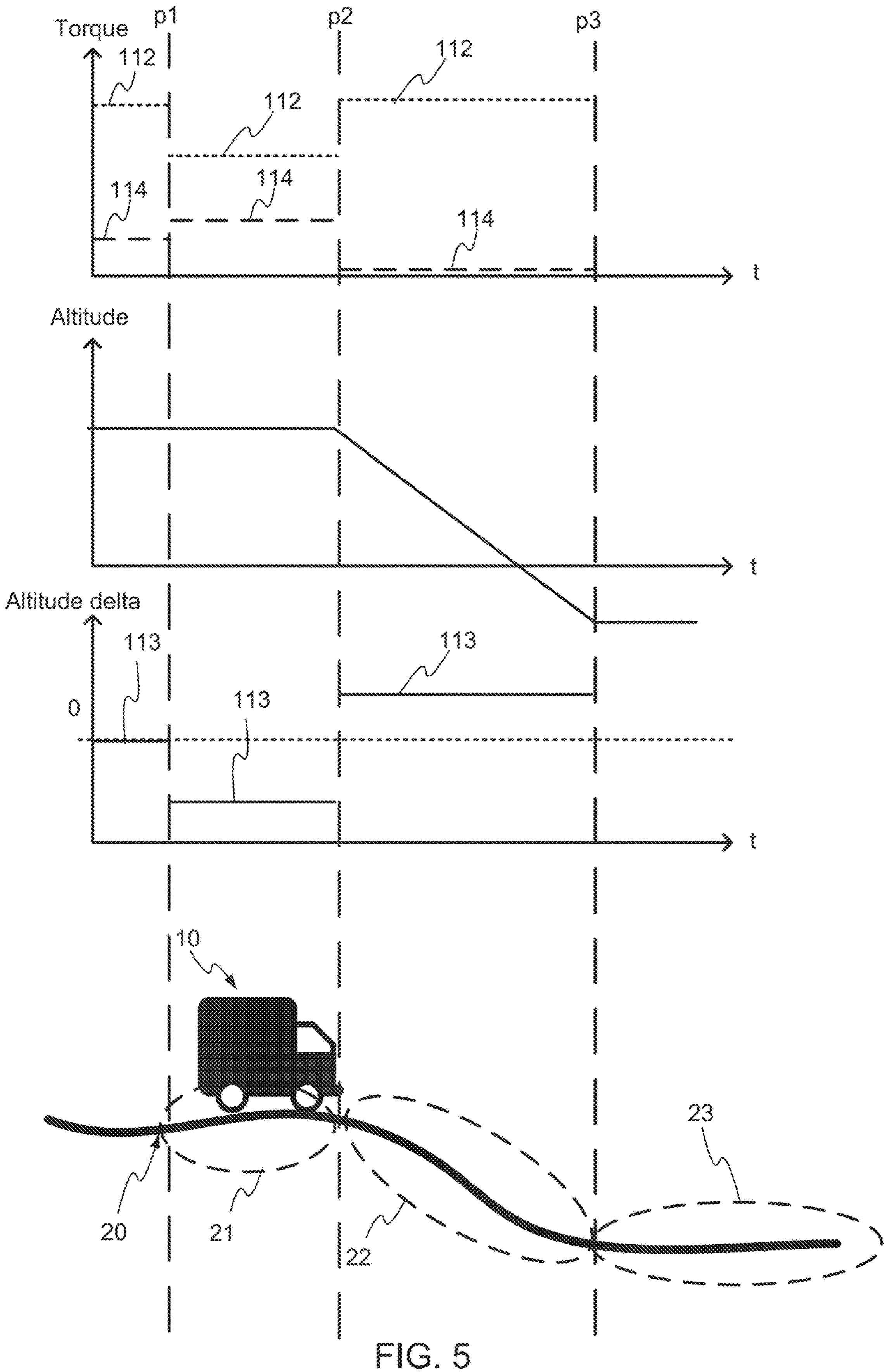
FIG. 5 is an exemplary driving scenario graphically illustrating changes of parameters and data according to an example.

With reference to FIG. 5, the teachings of the present disclosure will be explained by an exemplary scenario of a vehicle 10 traversing an uphill road segment. As seen at the bottom of FIG. 5, a vehicle 10 is traveling at a road 20. The road 20 comprises a current road segment 21 which is a segment of the road currently travelled by the vehicle 10. The vehicle 10 is travelling in a direction towards the right side of FIG. 1, and the current road segment 21 is followed by upcoming road segments 22, 23. The upcoming road segments 22, 23 are road segments the vehicle 10 is planning to, or likely to, travel (as described above by means of route data etc.) in response to continued motion towards said upcoming road segments 22, 23. A first upcoming road segment 22 is adjacent to and following the current road segment 21 and a second upcoming road segment 23 is adjacent to and following the first upcoming road segment 22.

In FIG. 5, the vertical dashed lines indicate specific points p1, p2, p3 in time at the three top graphs and corresponding locations for the vehicle 10 along the road 20 at the bottom graph. The top graph indicates the maximum propulsion torque 112 and the maximum retardation torque 114 and how these change as the vehicle 10 travels along the road 20. The second graph from the top indicates an altitude of the road 20 and may be obtained from the topography data 35, or the topography data 35 may be obtained from the altitude. The second lowest graph shows the topography change 113 between the current road segment 21 and the upcoming road segment 22, 23.

As seen in FIG. 5, the difference in altitude before a first point p1 and between the first point p1 and a second point p2 is substantially zero, see the topography change 113 before the first point p1. This means that the eco-friendly way of operating the vehicle 10 would be not to unduly change the speed of the vehicle 10. To this end, before the first point p1, the maximum propulsion torque 112 is reduced i.e. less propulsion indicatable by the operator-controlled input 14 (note that a baseline for this reduction is not shown in FIG. 5). At the same time, the maximum retardation torque 114 is reduced, i.e. less retardation indicatable by the operator-controlled input 14 (note that a baseline for this reduction is not shown in FIG. 5).

Further, the difference in altitude before the second point p2 (i.e. the current road segment 21) and between the second point p1 and a third point p3 (i.e. the first upcoming road segment 22) is negative, see the topography change 113 between the first point p1 and the second point p2. This means that the eco-friendly way of operating the vehicle 10 would be not to accelerate the vehicle 10 unnecessarily as the downhill slope will provide energy efficient acceleration, or at least the negative topography change 113 indicates a less energy inefficient acceleration. To this end, at the first point p1, the maximum propulsion torque 112 is reduced, i.e. less propulsion indicatable by the operator-controlled input 14. At the same time, the maximum retardation torque 114 is reduced, i.e. less retardation indicatable by the operator-controlled input 14.

The difference in altitude between the first upcoming road segment 22 and the second upcoming road segment 23 indicates an uphill change of slope, i.e. an end of the downhill slope of the first upcoming road segment 22, see the topography change 113 between the second point p2 and a third point p3. This means that the eco-friendly way of operating the vehicle 10 would be to accelerate the vehicle 10 at the downhill slope as this will provide more energy efficient acceleration, or at least the positive topography change 113 indicates a less energy efficient acceleration. The downhill slope also provides better opportunity to regenerate energy compared to the second upcoming road segment 23. To this end, at the second point p2, the maximum propulsion torque 112 is increased, i.e. more propulsion indicatable by the operator-controlled input 14. At the same time, the maximum retardation torque 114 is also increased, i.e. more retardation indicatable by the operator-controlled input 14.

Figure 6:
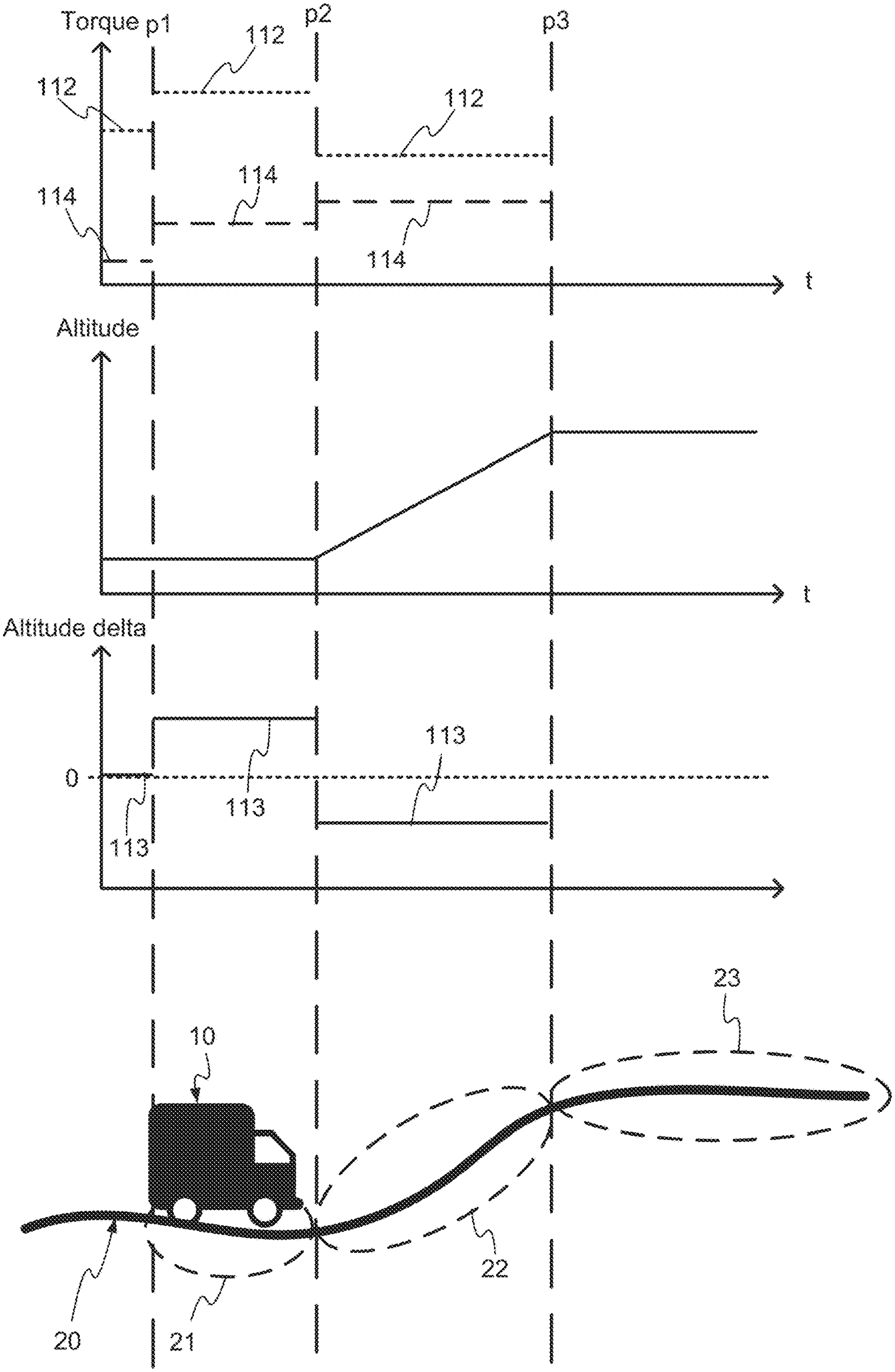
FIG. 6 is an exemplary driving scenario graphically illustrating changes of parameters and data according to an example.

With reference to FIG. 6, the teachings of the present disclosure will be explained by an exemplary scenario of a vehicle 10 traversing a downhill road segment. FIG. 6 corresponds to FIG. 5 in layout and order of the graphs.

As seen in FIG. 6, the difference in altitude before a first point p1 and between the first point p1 and a second point p2 is substantially zero, see the topography change 113 before the first point p1. This means that the eco-friendly way of operating the vehicle 10 would be not to unduly change the speed of the vehicle 10. To this end, before the first point p1, the maximum propulsion torque 112 is reduced i.e. less propulsion indicatable by the operator-controlled input 14 (note that a baseline for this reduction is not shown in FIG. 6). At the same time, the maximum retardation torque 114 is reduced, i.e. less retardation indicatable by the operator-controlled input 14 (note that a baseline for this reduction is not shown in FIG. 6).

Further, the difference in altitude before the second point p2 (i.e. the first road segment 21) and between the second point p1 and a third point p3 (i.e. the first upcoming road segment 22) is positive, see the topography change 113 between the first point p1 and the second point p2. This means that the eco-friendly way of operating the vehicle 10 would be to accelerate the vehicle 10 before reaching the uphill slope, as the uphill slope will reduce the energy efficiency of acceleration. To this end, at the first point p1, the maximum propulsion torque 112 is increased, i.e. more propulsion indicatable by the operator-controlled input 14. At the same time, the maximum retardation torque 114 is reduced, i.e. less retardation indicatable by the operator-controlled input 14.

The difference in altitude between the first upcoming road segment 22 and the second upcoming road segment 23 indicates a downhill change of slope, i.e. an end of the uphill slope of the first upcoming road segment 22, see the topography change 113 between the second point p2 and a third point p3. This means that the eco-friendly way of operating the vehicle 10 would be to wait with acceleration of the vehicle 10 until the uphill slope is reduced, as the substantially horizontal topography of the second upcoming road segment 23 will provide more energy efficient acceleration. To this end, at the second point p2, the maximum propulsion torque 112 is decreased, i.e. less propulsion indicatable by the operator-controlled input 14. At the same time, the maximum retardation torque 114 is also decreased, i.e. less retardation indicatable by the operator-controlled input 14.

The examples presented with reference to FIG. 5 and FIG. 6 will assist an operator (driver) of the vehicle 10 to propel the vehicle 10 in an eco-friendly manner. By considering the topography of the road segments ahead, drivers are assisted in optimizing energy efficiency by reducing the energy required to be provided by the propulsion source 12 of the vehicle 10 to climb steep inclines and utilizing gravity to assist in deceleration or maintaining speed on downhill stretches. By being assisted in reducing speed before ascending a hill, drivers can conserve fuel and reduce engine strain. Similarly, drives are assisted in gaining momentum on downhill slopes and thereby reducing a need for heavy acceleration further improving fuel efficiency. The identification of e.g. downhill sections by the computer system 100 assists drivers in utilizing regenerative braking more effectively, thereby increasing energy regeneration and extending a range of the vehicle 10.

Although not mentioned specifically in reference to the scenarios mentioned above, also a zero topography change 113 may mandate a change of the maximum propulsion torque 112 and/or the maximum retardation torque 114. For instance, if a downhill slope continues with a same slope, the topography change 113 may be zero but it may still be advantageous to further increase the maximum propulsion torque 112 and/or the maximum retardation torque 114.

It should be mentioned that the examples presented with reference to FIG. 5 and FIG. 6 are provided for explanatory purposes only and the skilled person will appreciate that e.g. the length of the different road segments 21, 22, 23 may be chosen freely. Shorter and/or different road segments 21, 22, 23 may allow the computer system 100 to be more responsive to changes in topography (or other eco-driving data 31). Longer and/or different road segments 21, 22, 23 may involve fewer calculations of e.g. the topography change 113. Further to this, the teachings of the present disclosure are advantageously performed continuously for an upcoming road segment 22, 23 having a predetermined or configurable length. The length may be configured based on e.g. a speed s of the vehicle 10.

As indicated in FIG. 3, the eco-driving data 31 may comprise additional or alternative data to the topography data 35. The skilled person will appreciate that the computer system 100 may utilize any of the eco-driving data 31 in order to control the maximum propulsion torque 112 and/or the maximum retardation torque 114 indicatable by the operator-controlled input 14. The eco-driving data 31 may be utilized in any combination in order to control the maximum propulsion torque 112 and/or the maximum retardation torque 114 indicatable by the operator-controlled input 14.

In some examples, the computer system 100 is configured to obtain a current speed s (see FIG. 4) of the vehicle 10 and speed limit data 33 of the current road segment 21. The maximum propulsion torque 112 is advantageously determined based on a difference between the current speed s of the vehicle 10 and the speed limit 33 of the current road segment 21. To exemplify, if the speed s of the vehicle 10 is significantly lower than the speed limit data 33, the maximum propulsion torque 112 may be increased allowing the vehicle 10 to accelerate more quickly. If the speed s of the vehicle 10 is marginally lower than, or the same as the speed limit data 33, the maximum propulsion torque 112 may be decreased preventing the vehicle 10 to accelerate too quickly. Similarly, the maximum retardation torque 114 is advantageously determined based on a difference between the current speed s of the vehicle 10 and the speed limit 33 of the current road segment 21. To exemplify, if the speed s of the vehicle 10 is significantly higher than the speed limit data 33, the maximum retardation torque 114 may be increased allowing the vehicle 10 to regeneratively brake more strongly (i.e. provide more braking torque). If the speed s of the vehicle 10 is marginally higher than or the same as the speed limit data 33, the maximum retardation torque 114 may be decreased, thereby preventing the vehicle 10 from de-accelerating too much. The corresponding reasoning may be applied in anticipation of a change in speed limit data 33, i.e. that a speed limit of the current road segment 21 is different from a speed limit of the upcoming road segment 22.

In some examples, the computer system 100 is configured to obtain traffic data 34 for the upcoming road segment 22 and to determine the maximum propulsion torque 112 and/or the maximum retardation torque 114 based on the traffic data 34. The traffic data 34 may anticipate traffic congestion and the computer system 100 may make informed decisions to avoid or minimize idling in traffic. Idling consumes fuel unnecessarily, leading to increased emissions. To exemplify, if the traffic data 34 for the upcoming road segment 22 indicate a traffic congestion, the maximum propulsion torque 112 may be decreased and/or the maximum retardation torque 114 may be increased as it is likely that the congestion will force a speed reduction.

In some examples, the computer system 100 is configured to obtain road layout data 32 for the upcoming road segment 22 and to determine the maximum propulsion torque 112 and/or the maximum retardation torque 114 based on the road layout data 32. The road layout data 32 advantageously comprises, as the name suggests, data relating to a layout of the road and may comprise e.g. indications of roundabouts, crossings, sharp turns etc. To exemplify, if the road layout data 32 for the upcoming road segment 22 indicate a sharp turn, it is likely that a speed of the vehicle 10 should be reduced before entering the sharp turn. To this end, the maximum propulsion torque 112 may be decreased and/or the maximum retardation torque 114 may be increased to assist the driver in driving eco-friendly.

In some examples, the computer system 100 is configured to obtain weather data 36. The weather data 36 may indicate temperatures, a risk of rain, wind (direction and/or strength) etc. The temperatures (optionally in combination with e.g. topography data 35 or rain) may be utilized to estimate if there is a risk for an icy or otherwise slippery road (aquaplaning) which may result in a too high propulsion or retardation torque 112, 114 causing the vehicle 10 to slip. This implies that that the maximum propulsion torque 112 and/or the maximum retardation torque 114 may be decreased in response to determining that the upcoming road segment 22 (or the current road segment 21) may be slippery. The wind may be utilized in accordance with the topography data 35, that is to say, in anticipation of an upcoming head wind (e.g. the road makes a turn into the wind), this may be compared to an uphill topography change 113. In this case, it would be more energy efficient to accelerate the vehicle 10 at a current road segment 21 with a side wind. That is to say, the maximum propulsion torque 112 is advantageously increased at the current road segment 21 (decreased at the upcoming road segment 22) and/or the maximum retardation torque 114 is advantageously decreased at the current road segment 21 (increased at the upcoming road segment 22). Similarly, if an upcoming road segment 22 will offer a wind at the back of the vehicle 10, this may be compared to a downhill topography change 113. In this case, it would be more energy efficient to delay acceleration of the vehicle 10 until the upcoming road segment 22 is reached. That is to say, the maximum propulsion torque 112 is advantageously decreased at the current road segment 21 (increased at the upcoming road segment 22) and/or the maximum retardation torque 114 is advantageously decreased at the current road segment 21 (increased at the upcoming road segment 22).

As mentioned, all the exemplified data utilized to control the maximum propulsion torque 112 and/or the maximum retardation torque 114 may be implemented stand-alone or freely combined with each other. If combined, the respective changes (increase or decrease) determined based on the respective eco-driving data 31, are advantageously weighted together to determine the maximum propulsion torque 112 and/or the maximum retardation torque 114 indicatable by the operator-controlled input 14. It should be mentioned that an amount of change, i.e. an amount of increase and decrease of the maximum propulsion torque 112 and/or the maximum retardation torque 114 is/are advantageously weighted by the associated eco-driving data 31. To exemplify, if an upcoming steep downhill segment is indicated by the topography change 113, the amount of decrease of the maximum propulsion torque 112 is advantageously higher than the amount of decrease of the maximum propulsion torque 112 if a less steep upcoming downhill segment is indicated by the topography change 113.

It should further be mentioned that when referring to the relative changes, i.e. increasing or decreasing of the maximum propulsion torque 112 and/or the maximum retardation torque 114, this implies a change from a current value. In some examples, the change of the maximum propulsion torque 112 and/or the maximum retardation torque 114 may comprise setting the maximum propulsion torque 112 and/or the maximum retardation torque 114 at a predefined, configurable or determined value. The predefined, configurable or determined value may be selected based on e.g. the eco-driving data 31.

The examples, features and teachings of the present disclosure have to this point mainly been described with reference to a computer system 100. The computer system 100 may, as mentioned, be comprised in a vehicle 10. This is but one exemplary implementation of the teachings of the present disclosure. The features, examples and options presented herein may be implemented in numerous different devices or methods.

Figure 7:
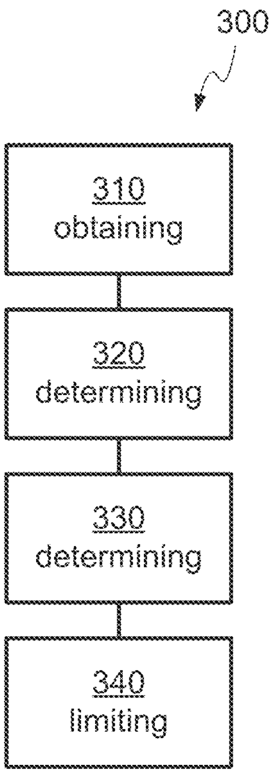
FIG. 7 is a block diagram of a method according to an example.

With reference to FIG. 7, a method 300 of the present disclosure will be presented. The method 300 is advantageously a computer implemented method 300 that may be expanded, modified or altered to comprise any or all features, examples or options presented herein.

As seen in the example of FIG. 7, the method 300 comprises obtaining 310 topography data 35 of the current road segment 21 and the upcoming road segment 22. The topography data 35 may be any topography data 35 presented herein and may be obtained by any suitable circuit, device or function presented herein. Advantageously, the topography data 35 is obtained by the processing circuitry 110 of the computer system 100.

The method 300 further comprises determining 320 the topography change 113 between the current road segment 21 and the upcoming road segment 22. The topography change 113 may be determined by any suitable circuit, device or function presented herein. Advantageously, the topography change 114 is determined by the processing circuitry 110 of the computer system 100.

The method 300 further comprises determining 330 the maximum propulsion torque 112 and/or retardation torque 114 based on the topography change 113. The maximum propulsion torque 112 and/or the maximum retardation torque 114 may be determined by any suitable circuit, device or function presented herein. Advantageously, the maximum propulsion torque 112 and/or the maximum retardation torque 114 is determined by the processing circuitry 110 of the computer system 100.

The method 300 further comprises limiting 340 the torque 115 indicatable by the operator-controlled input 14 of the vehicle 10 based on the maximum propulsion torque 112 and/or retardation torque 114. The limitation of the maximum propulsion torque 112 and/or the maximum retardation torque 114 may be provided by any suitable circuit, device or function presented herein. Advantageously, the limitation of the maximum propulsion torque 112 and/or the maximum retardation torque 114 is provided by the processing circuitry 110 of the computer system 100.

Figure 8:
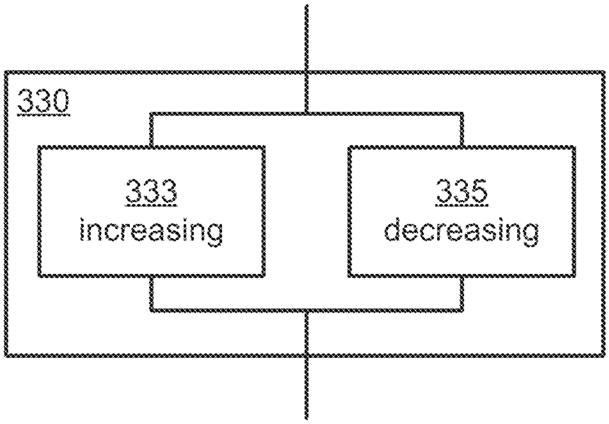
FIG. 8 is a block diagram of a method according to an example.

In FIG. 8 some further optional details of determining 330 the maximum propulsion torque 112 and/or retardation torque 114 based on the topography change 113 is shown. The method 300 may additionally, or alternatively, comprise increasing 333 the maximum propulsion torque 112 based on the topography change 113 and/or any other eco-driving data 31 presented herein. The method 300 may additionally, or alternatively, comprise decreasing 335 the maximum propulsion torque 112 based on the topography change 113 and/or any other eco-driving data 31 presented herein. The method 300 may additionally, or alternatively, comprise increasing 333 the maximum retardation torque 114 based on the topography change 113 and/or any other eco-driving data 31 presented herein. The method 300 may additionally, or alternatively, comprise decreasing 335 the maximum retardation torque 114 based on the topography change 113 and/or any other eco-driving data 31 presented herein. The increasing 333 and/or the decreasing 335 may be provided by any suitable circuit, device or function presented herein. Advantageously, the increasing 333 and/or the decreasing 335 is provided by the processing circuitry 110 of the computer system 100.

Figure 9:
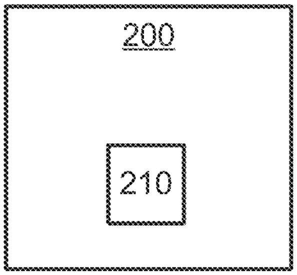
FIG. 9 is a block diagram of a pedal drive circuitry according to an example.

In FIG. 9, a block diagram of a pedal drive circuitry 200 is shown. The pedal drive circuitry 200 is configured for controlling the torque 115 indicatable by the operator-controlled input 14 of the vehicle 10. The pedal drive circuitry 200 comprises a processing circuitry 210 that may be the processing circuitry 110 of the computer system 100. The processing circuitry 210 is configured to cause obtaining of topography data 35 of the current road segment 21 and the upcoming road segment 22. The processing circuitry 210 is further configured to cause determining of the topography change 113 between the current road segment 21 and the upcoming road segment 22. In addition to this, the processing circuitry 210 is configured to cause determining of the maximum propulsion torque 112 and/or the maximum retardation torque 114 based on the topography change 113 and limiting of the torque 115 indicatable by the operator-controlled input 14 based on the maximum propulsion torque 112 and/or the maximum retardation torque 114.

The pedal drive circuitry 200 may further be configured to cause the provisioning of any further feature or example mentioned herein, specifically in reference to the computer system 100.

In some examples, the pedal drive circuitry 200 is configured to cause execution of the method 300 presented in reference to FIG. 7 and FIG. 8.

Figure 10:
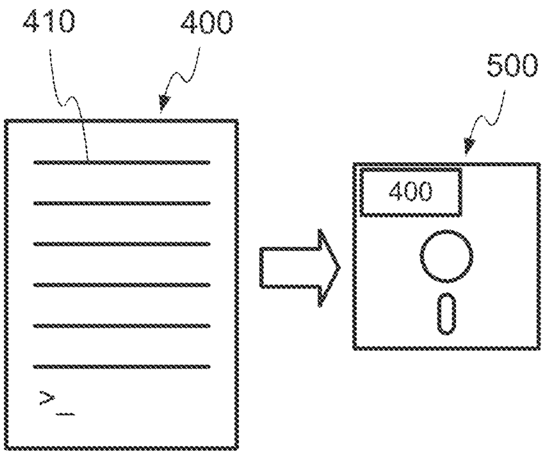
FIG. 10 is a schematic view of a computer readable storage-medium and a computer program product according to an example.

In FIG. 10 a computer readable storage medium 500 is shown. The computer readable storage medium 500 is illustrated as a vintage 5.25" floppy drive but may be any suitable volatile or advantageously non-transitory (non-volatile) computer readable storage medium exemplified by, but not limited to, a Hard Disk Drive (HDD), a Solid State Drive (SSD), an USB Flash Drives, a memory card (such as Secure Digital (SD) cards, CompactFlash (CF) cards), an optical disc (such as CD (Compact Disc), DVD (Digital Versatile Disc), and Blu-ray Disc) or a magnetic tape. The computer readable storage medium 500 comprises (stores, having stored thereon) a computer program product 400 (computer program) comprising computer code 410 (program code, program instructions, instructions). When the computer readable storage medium 500 is loaded and executed by a processing circuitry 110, 210, the processing circuitry 110, 210 performs, or causes the performance or the method 300 described with reference to FIG. 7 and FIG. 8.

Figure 11:
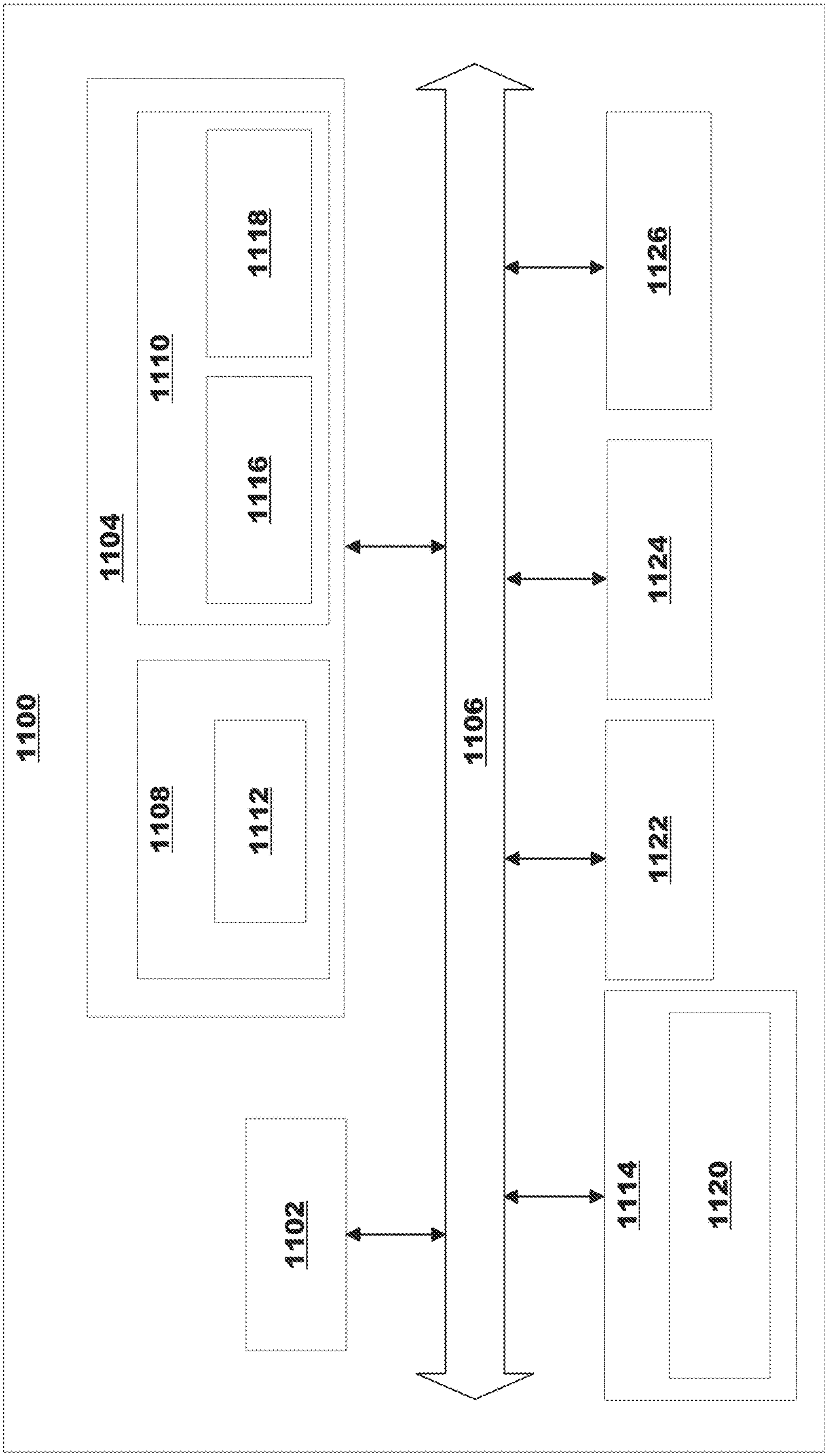
FIG. 11 is a schematic diagram of an exemplary computer system for implementing examples disclosed herein, according to an example

FIG. 11 is a schematic diagram of a computer system 1100 for implementing examples disclosed herein. The computer system 1100 of FIG. 11 may be the computer system 100 previously presented herein. The computer system 1100 is adapted to execute instructions from a computer-readable medium to perform these and/or any of the functions or processing described herein. The computer system 1100 may be connected (e.g., networked) to other machines in a LAN, an intranet, an extranet, or the Internet. While only a single device is illustrated, the computer system 1100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1100 may comprise at least one computing device or electronic device capable of including firmware, hardware, and/or executing software instructions to implement the functionality described herein. The computer system 1100 may include processing circuitry 1102 (e.g., processing circuitry including one or more processor devices or control units), a memory 1104, and a system bus 1106. The processing circuitry 1102 may be the processing circuitry 110 previously presented herein. The computer system 1100 may be the computer system 100 previously presented herein. The computer system 1100 may include at least one computing device having the processing circuitry 1102. The system bus 1106 provides an interface for system components including, but not limited to, the memory 1104 and the processing circuitry 1102. The processing circuitry 1102 may include any number of hardware components for conducting data or signal processing or for executing computer code stored in memory 1104. The processing circuitry 1102 may, for example, include a general-purpose processor, an application specific processor, a Digital Signal Processor (DSP), an Application Specific Integrated Circuitry (ASIC), a Field Programmable Gate Array (FPGA), a circuitry containing processing components, a group of distributed processing components, a group of distributed computers configured for processing, or other programmable logic device, discrete gate or transistor logic, discrete hardware components, or any combination thereof designed to perform the functions described herein. The processing circuitry 1102 may further include computer executable code that controls operation of the programmable device.

The system bus 1106 may be any of several types of bus structures that may further interconnect to a memory bus (with or without a memory controller), a peripheral bus, and/or a local bus using any of a variety of bus architectures. The memory 1104 may be one or more devices for storing data and/or computer code for completing or facilitating methods described herein. The memory 1104 may include database components, object code components, script components, or other types of information structure for supporting the various activities herein. Any distributed or local memory device may be utilized with the systems and methods of this description. The memory 1104 may be communicably connected to the processing circuitry 1102 (e.g., via a circuitry or any other wired, wireless, or network connection) and may include computer code for executing one or more processes described herein. The memory 1104 may include non-volatile memory 1108 (e.g., read-only memory (ROM), erasable programmable read-only memory (EPROM), electrically erasable programmable read-only memory (EEPROM), etc.), and volatile memory 1110 (e.g., random-access memory (RAM)), or any other medium which can be used to carry or store desired program code in the form of machine-executable instructions or data structures and which can be accessed by a computer or other machine with processing circuitry 1102. A basic input/output system (BIOS) 1112 may be stored in the non-volatile memory 1108 and can include the basic routines that help to transfer information between elements within the computer system 1100.

The computer system 1100 may further include or be coupled to a non-transitory computer-readable storage medium such as the storage device 1114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1114 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1114 and/or in the volatile memory 1110, which may include an operating system 1116 and/or one or more program modules 1118. All or a portion of the examples disclosed herein may be implemented as a computer program 1120 stored on a transitory or non-transitory computer-usable or computer-readable storage medium (e.g., single medium or multiple media), such as the storage device 1114, which includes complex programming instructions (e.g., complex computer-readable program code) to cause the processing circuitry 1102 to carry out actions described herein. Thus, the computer-readable program code of the computer program 1120 can comprise software instructions for implementing the functionality of the examples described herein when executed by the processing circuitry 1102. In some examples, the storage device 1114 may be a computer program product (e.g., readable storage medium) storing the computer program 1120 thereon, where at least a portion of a computer program 1120 may be loadable (e.g., into a processor) for implementing the functionality of the examples described herein when executed by the processing circuitry 1102. The processing circuitry 1102 may serve as a controller or control system for the computer system 1100 that is to implement the functionality described herein.

The computer system 1100 may include an input device interface 1122 configured to receive input and selections to be communicated to the computer system 1100 when executing instructions, such as from a keyboard, mouse, touch-sensitive surface, etc. Such input devices may be connected to the processing circuitry 1102 through the input device interface 1122 coupled to the system bus 1106 but can be connected through other interfaces, such as a parallel port, an Institute of Electrical and Electronic Engineers (IEEE) 1394 serial port, a Universal Serial Bus (USB) port, an IR interface, and the like. The computer system 1100 may include an output device interface 1124 configured to forward output, such as to a display, a video display unit (e.g., a liquid crystal display (LCD) or a cathode ray tube (CRT)). The computer system 1100 may include a communications interface 1126 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1. A computer system 100 comprising processing circuitry 110 configured to: obtain topography data 35 of a current road segment 21 and an upcoming road segment 22, 23; determine a topography change 113 between the current road segment 21 and the upcoming road segment 22, 23; determine a maximum propulsion torque 112 based on the topography change 113; and limit a torque 115 indicatable by an operator-controlled input 14 of a vehicle 10 based on the maximum propulsion torque 112.

Example 2. The computer system 100 of example 1, wherein the processing circuitry 110 is further configured to: responsive to the topography change 113 indicating an uphill change in topography, increase the maximum propulsion torque 112.

Example 3. The computer system 100 of example 1 or 2, wherein the processing circuitry 110 is further configured to: responsive to the topography change 113 indicating a downhill change in topography, decrease the maximum propulsion torque 112.

Example 4. The computer system 100 of any one of examples 1 to 3, wherein the processing circuitry 110 is further configured to: determine a maximum retardation torque 114 based on the topography change 113; and limit the torque 115 indicatable by the operator-controlled pedal of the vehicle 10 based on the maximum retardation torque 114.

Example 5. The computer system 100 of example 4, wherein the processing circuitry 110 is further configured to: responsive to the topography change 113 indicating an uphill change in topography, decrease the maximum retardation torque 114.

Example 6. The computer system 100 of example 4 or 5, wherein the processing circuitry 110 is further configured to: responsive to the topography change 113 indicating a downhill change in topography, increase the maximum retardation torque 114.

Example 7. The computer system 100 of any one of examples 1 to 6, wherein the processing circuitry 110 is further configured to: obtain a current speed s of the vehicle 10 and a speed limit 33 of the current road segment 21; and determine the maximum propulsion torque 112 based on a difference between the current speed s of the vehicle 10 and the speed limit 33 of the current road segment 21.

Example 8. The computer system 100 of any one of examples 4 to 7, wherein the processing circuitry 110 is further configured to: obtain a current speed s of the vehicle 10 and a speed limit 33 of the upcoming road segment 22, 23; and determine the maximum retardation torque 114 based on a difference between the current speed s of the vehicle 10 and the speed limit 33 of the upcoming road segment 22, 23.

Example 9. The computer system 100 of any one of examples 1 to 8, wherein the processing circuitry 110 is further configured to: obtain traffic data 34 for the upcoming road segment 22, 23; and determine the maximum propulsion torque 112 based on the traffic data 34 of the upcoming road segment 22, 23.

Example 10. The computer system 100 of any one of examples 4 to 9, wherein the processing circuitry 110 is further configured to: obtain traffic data 34 for the upcoming road segment 22, 23; and determine the maximum retardation torque 114 based on the traffic data 34 of the upcoming road segment 22, 23.

Example 11. The computer system 100 of any one of examples 1 to 10, wherein the processing circuitry 110 is further configured to: obtain road layout data 32 for the upcoming road segment 22, 23; and determine the maximum propulsion torque 112 based on the road layout data 32 of the upcoming road segment 22, 23.

Example 12. The computer system 100 of any one of examples 4 to 11, wherein the processing circuitry 110 is further configured to: obtain road layout data 32 for the upcoming road segment 22, 23; and determine the maximum retardation torque 114 based on the road layout data 32 of the upcoming road segment 22, 23.

Example 13. The computer system 100 of any one of examples 1 to 12, wherein the operator-controlled input 14 is a pedal of the vehicle 10, preferably an accelerator of the vehicle 10.

Example 14. The computer system 100 of any one of examples 1 to 13, wherein the processing circuitry 110 is further configured to limit the torque 115 indicatable by the operator-controlled input 14 by controlling a haptic feedback of the operator-controlled input 14.

Example 15. The computer system 100 of example 1, wherein the processing circuitry 110 is further configured to responsive to the topography change 113 indicating an uphill change in topography, increase the maximum propulsion torque 112; responsive to the topography change 113 indicating a downhill change in topography, decrease the maximum propulsion torque 112; determine a maximum retardation torque 114 based on the topography change 113, and limit the torque 115 indicatable by the operator-controlled pedal of the vehicle 10 based on the maximum retardation torque 114; responsive to the topography change 113 indicating an uphill change in topography, decrease the maximum retardation torque 114; responsive to the topography change 113 indicating a downhill change in topography, increase the maximum retardation torque

114; obtain a current speed s of the vehicle 10 and a speed limit 33 of the current road segment 21, and determine the maximum propulsion torque 112 based on a difference between the current speed s of the vehicle 10 and the speed limit 33 of the current road segment 21; obtain a current speed s of the vehicle 10 and a speed limit 33 of the upcoming road segment 22, 23, and determine the maximum retardation torque 114 based on a difference between the current speed s of the vehicle 10 and the speed limit 33 of the upcoming road segment 22, 23; obtain traffic data 34 for the upcoming road segment 22, 23, and determine the maximum propulsion torque 112 based on the traffic data 34 of the upcoming road segment 22, 23; obtain traffic data 34 for the upcoming road segment 22, 23, and determine the maximum retardation torque 114 based on the traffic data 34 of the upcoming road segment 22, 23; obtain road layout data 32 for the upcoming road segment 22, 23, and determine the maximum propulsion torque 112 based on the road layout data 32 of the upcoming road segment 22, 23; and obtain road layout data 32 for the upcoming road segment 22, 23, and determine the maximum retardation torque 114 based on the road layout data 32 of the upcoming road segment 22, 23; the operator-controlled input 14 is an accelerator of the vehicle 10 and the processing circuitry 110 is further configured to limit the torque 115 indicatable by the operator-controlled input 14 by controlling a haptic feedback of the operator-controlled input 14.

Example 16. A pedal drive circuitry 200 for controlling a torque 115 indicatable by an operator-controlled input 14 of a vehicle 10, the pedal drive circuitry 200 comprises a processing circuitry 210 configured to cause: obtaining of topography data 35 of a current road segment 21 and an upcoming road segment 22, 23; determining of a topography change 113 between the current road segment 21 and the upcoming road segment 22, 23; determining of a maximum propulsion torque 112 based on the topography change 113; and limiting of a torque 115 indicatable by the operator-controlled input 14 of the vehicle 10 based on the maximum propulsion torque 112.

Example 17. The pedal drive circuitry 200 of example 16, wherein the processing circuitry 210 is further configured to cause: determining of a maximum retardation torque 114 based on the topography change 113; and limiting of the torque 115 indicatable by the operator-controlled input 14 of the vehicle 10 based on the maximum retardation torque 114.

Example 18. A vehicle 10 comprising the computer system 100 of any one of examples 1-15.

Example 19. A computer implemented method 300 comprising: obtaining 310, by processing circuitry 110 of a computer system 100, topography data 35 of a current road segment 21 and an upcoming road segment 22, 23; determining 320, by the processing circuitry 110 of the computer system 100, a topography change 113 between the current road segment 21 and the upcoming road segment 22, 23; determining 330, by the processing circuitry 110 of the computer system 100, a maximum propulsion torque 112 based on the topography change 113; and limiting 340, by the processing circuitry 110 of the computer system 100, a torque 115 indicatable by an operator-controlled input 14 of a vehicle 10 based on the maximum propulsion torque 112.

Example 20. The computer implemented method 300 of example 19, further comprising: responsive to the topography change 113 indicating an uphill change in topography, increasing 333, by the processing circuitry 110 of the computer system 100, the maximum propulsion torque 112.

Example 21. The computer implemented method 300 of example 19 or 20, further comprising: responsive to the topography change 113 indicating a downhill change in topography, decreasing 335, by the processing circuitry 110 of the computer system 100, the maximum propulsion torque 112.

Example 22. The computer implemented method 300 of any one of examples 19 to 21, further comprising: determining 330, by the processing circuitry 110 of the computer system 100, a maximum retardation torque 114 based on the topography change 113; and limiting 340, by the processing circuitry 110 of the computer system 100, the torque 115 indicatable by the operator-controlled input 14 of the vehicle 10 based on the maximum retardation torque 114.

Example 23. The computer implemented method 300 of example 22, further comprising: responsive to the topography change 113 indicating an uphill change in topography, decreasing 335, by the processing circuitry 110 of the computer system 100, the maximum retardation torque 114.

Example 24. The computer implemented method 300 of example 22 or 23, further comprising: responsive to the topography change 113 indicating a downhill change in topography, increasing 333, by the processing circuitry 110 of the computer system 100, the maximum retardation torque 114.

Example 25. The computer implemented method 300 of any one of examples 19 to 24, further comprising: obtaining 310, by the processing circuitry 110 of the computer system 100, a current speed s of the vehicle 10 and a speed limit 33 of the current road segment 21; and determining 330, by the processing circuitry 110 of the computer system 100, the maximum propulsion torque 112 based on a difference between the current speed s of the vehicle 10 and the speed limit 33 of the current road segment 21.

Example 26. The computer implemented method 300 of any one of examples 22 to 25, further comprising: obtaining 310, by the processing circuitry 110 of the computer system 100, a current speed s of the vehicle 10 and a speed limit 33 of the upcoming road segment 22, 23; and determining 330, by the processing circuitry 110 of the computer system 100, the maximum retardation torque 114 based on a difference between the current speed s of the vehicle 10 and the speed limit 33 of the upcoming road segment 22, 23.

Example 27. The computer implemented method 300 of any one of examples 19 to 26, further comprising: obtaining 310, by the processing circuitry 110 of the computer system 100, traffic data 34 for the upcoming road segment 22, 23; and determining 330, by the processing circuitry 110 of the computer system 100, the maximum propulsion torque 112 based on the traffic data 34 of the upcoming road segment 22, 23.

Example 28. The computer implemented method 300 of any one of examples 22 to 27, further comprising: obtaining 310, by the processing circuitry 110 of the computer system 100, traffic data 34 for the upcoming road segment 22, 23; and determining 330, by the processing circuitry 110 of the computer system 100, the maximum retardation torque 114 based on the traffic data 34 of the upcoming road segment 22, 23.

Example 29. The computer implemented method 300 of any one of examples 19 to 28, further comprising: obtaining 310, by the processing circuitry 110 of the computer system 100, road layout data 32 for the upcoming road segment 22, 23; and determining 330, by the processing circuitry 110 of the computer system 100, the maximum propulsion torque 112 based on the road layout data 32 of the upcoming road segment 22, 23.

Example 30. The computer implemented method 300 of any one of examples 22 to 29, further comprising: obtaining 310, by the processing circuitry 110 of the computer system 100, road layout data 32 for the upcoming road segment 22, 23; and determining 330, by the processing circuitry 110 of the computer system 100, the maximum retardation torque 114 based on the road layout data 32 of the upcoming road segment 22, 23.

Example 31. The computer implemented method 300 of any one of examples 19 to 30, wherein the operator-controlled input 14 is a pedal of the vehicle 10, preferably an accelerator of the vehicle 10.

Example 32. The computer implemented method 300 of any one of examples 19 to 31, wherein limiting 340, by the processing circuitry 110 of the computer system 100, the torque 115 indicatable by the operator-controlled input 14 comprises controlling, by the processing circuitry 110 of the computer system 100, a haptic feedback of the operator-controlled input 14.

Example 33. A computer program product 400 comprising instructions 410 for performing, when executed by the processing circuitry 110, the method 300 of any of examples 19-31.

Example 34. A non-transitory computer-readable storage medium 500 comprising instructions 410, which when executed by the processing circuitry 110, cause the processing circuitry 110 to perform the method 300 of any of examples 19-31.

The invention of the present disclosure is defined by the independent claims. Preferred embodiments are defined by the dependent claims.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

obtain topography data of a current road segment and an upcoming road segment;

determine a topography change between the current road segment and the upcoming road segment;

determine a maximum propulsion torque based on the topography change;

limit a torque indicatable by an operator-controlled input of a vehicle based on the maximum propulsion torque;

determine a maximum retardation torque based on the topography change; and limit the torque indicatable by the operator-controlled input of the vehicle based on the maximum retardation torque.

2. The computer system of claim 1, wherein the processing circuitry is further configured to:

responsive to the topography change indicating an uphill change in topography, increase the maximum propulsion torque; and/or responsive to the topography change indicating a downhill change in topography, decrease the maximum propulsion torque.

3. The computer system of claim 1, wherein the processing circuitry is further configured to:

responsive to the topography change indicating an uphill change in topography, decrease the maximum retardation torque; and/or responsive to the topography change indicating a downhill change in topography, increase the maximum retardation torque.

4. The computer system of claim 1, wherein the processing circuitry is further configured to: obtain traffic data for the upcoming road segment; and determine the maximum propulsion torque based on the traffic data of the upcoming road segment.

5. The computer system of claim 1, wherein the processing circuitry is further configured to: obtain traffic data for the upcoming road segment; and determine the maximum retardation torque based on the traffic data of the upcoming road segment.

6. The computer system of claim 1, wherein the processing circuitry is further configured to: obtain road layout data for the upcoming road segment; and determine the maximum propulsion torque based on the road layout data of the upcoming road segment.

7. The computer system of claim 1, wherein the processing circuitry is further configured to: obtain road layout data for the upcoming road segment; and determine the maximum retardation torque based on the road layout data of the upcoming road segment.

8. The computer system of claim 1, wherein the operator-controlled input is a pedal of the vehicle, preferably an accelerator of the vehicle.

9. The computer system of claim 1, wherein the processing circuitry is further configured to limit the torque indicatable by the operator-controlled input by controlling a haptic feedback of the operator-controlled input.

10. The computer system of claim 1, wherein the processing circuitry is further configured to:

responsive to the topography change indicating an uphill change in topography, increase the maximum propulsion torque;

responsive to the topography change indicating a downhill change in topography, decrease the maximum propulsion torque;

responsive to the topography change indicating an uphill change in topography, decrease the maximum retardation torque;

responsive to the topography change indicating a downhill change in topography, increase the maximum retardation torque;

obtain a current speed of the vehicle and a speed limit of the current road segment;

determine the maximum propulsion torque based on a difference between the current speed of the vehicle and the speed limit of the current road segment; and limit the torque indicatable by the operator-controlled input by controlling a haptic feedback of the operator-controlled input;

wherein the operator-controlled input is a pedal of the vehicle, preferably an accelerator of the vehicle.

11. A vehicle comprising the computer system of claim 1.

12. A computer implemented method comprising:

obtaining, by processing circuitry of a computer system, topography data of a current road segment and an upcoming road segment;

determining, by the processing circuitry of the computer system, a topography change between the current road segment and the upcoming road segment;

determining, by the processing circuitry of the computer system, a maximum propulsion torque based on the topography change;

limiting, by the processing circuitry of the computer system, a torque indicatable by an operator-controlled input of a vehicle based on the maximum propulsion torque;

determining, by the processing circuitry of the computer system, a maximum retardation torque based on the topography change; and limiting, by the processing circuitry of the computer system, the torque indicatable by the operator-controlled input of the vehicle based on the maximum retardation torque.

13. The computer implemented method of claim 12, further comprising:

responsive to the topography change indicating an uphill change in topography, increasing, by the processing circuitry of the computer system, the maximum propulsion torque; and/or responsive to the topography change indicating a downhill change in topography, decreasing, by the processing circuitry of the computer system, the maximum propulsion torque.

14. The computer implemented method of claim 12, further comprising:

responsive to the topography change indicating an uphill change in topography, decreasing, by the processing circuitry of the computer system, the maximum retardation torque; and/or responsive to the topography change indicating a downhill change in topography, increasing, by the processing circuitry of the computer system, the maximum retardation torque.

15. The computer implemented method of claim 12, further comprising: obtaining, by the processing circuitry of the computer system, a current speed of the vehicle and a speed limit of the current road segment; and determining, by the processing circuitry of the computer system, the maximum propulsion torque based on a difference between the current speed s of the vehicle and the speed limit of the current road segment.

16. A non-transitory computer-readable storage medium comprising instructions, which when executed by the processing circuitry, cause the processing circuitry to perform the method of claim 12.

17. A computer system comprising processing circuitry configured to:

obtain topography data of a current road segment and an upcoming road segment;

determine a topography change between the current road segment and the upcoming road segment;

determine a maximum propulsion torque based on the topography change; and limit a torque indicatable by an operator-controlled input of a vehicle based on the maximum propulsion torque;

obtain a current speed of the vehicle and a speed limit of the current road segment; and determine the maximum propulsion torque based on a difference between the current speed of the vehicle and the speed limit of the current road segment.

* * * * *